United States Patent [19]

Eskeli

[11] 4,167,371

[45] Sep. 11, 1979

[54] METHOD OF FLUID PRESSURIZATION

[76] Inventor: Michael Eskeli, 7994-41 Locke Lee, Houston, Tex. 77042

[21] Appl. No.: 825,701

[22] Filed: Sep. 6, 1977

[51] Int. Cl.² ............................................. F04B 41/00
[52] U.S. Cl. ........................................ 417/53; 60/650; 62/86; 417/243
[58] Field of Search ...................... 60/650, 682; 62/86, 62/87, 88, 401, 402, 499, 500; 417/53, 243, 247; 165/88, 90, DIG. 12, 86

[56] References Cited

U.S. PATENT DOCUMENTS

| 3,470,704 | 10/1969 | Kantor | 62/499 |
|---|---|---|---|
| 4,044,824 | 8/1977 | Eskeli | 62/86 |
| 4,057,965 | 11/1977 | Eskeli | 60/650 |
| 4,060,989 | 12/1977 | Eskeli | 60/650 |

FOREIGN PATENT DOCUMENTS

| 633985 | 6/1937 | Fed. Rep. of Germany | 165/86 |
|---|---|---|---|
| 26184 | 11/1907 | United Kingdom | 165/88 |
| 936059 | 9/1963 | United Kingdom | 165/90 |

*Primary Examiner*—Sheldon Jay Richter

[57] ABSTRACT

A method and apparatus for transferring heat regeneratively in a rotating heat exchanger. The heat exchanger provides for the cold gas stream to be heated alternate compression and expansion with heat addition usually during the expansion phase of the compression-expansion step from a warmer fluid. The fluid to be heated is usually a gas, while the fluid releasing heat may be either a gas or liquid. The heat element is a folded member usually in the form of bellows mounted concentric with rotor shaft, with baffles within to provide for outward and inward movement of the gas. Due to the heat addition especially during the expansion steps, the gas to be heated gains in pressure and usually this pressure gain is work free, and in magnitude is similar to the constant volume heat addition pressure gain which is well known.

2 Claims, 3 Drawing Figures

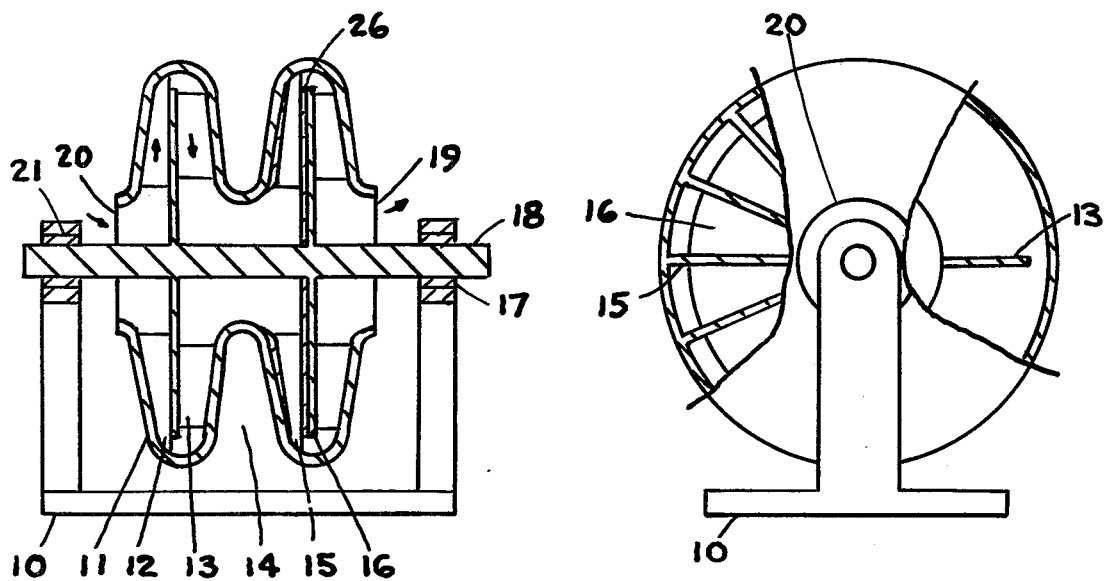
FIG. 1
FIG. 2
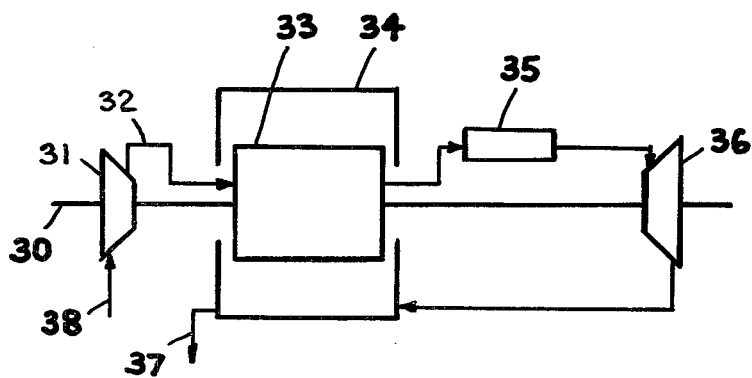
FIG. 3

METHOD OF FLUID PRESSURIZATION

BACKGROUND OF THE INVENTION

This invention relates generally to heat exchangers where a colder fluid stream is heated by a warmer fluid stream, and particularly to rotating heat exchangers where a gaseous fluid is alternately compressed and expanded with heat addition to provide for a pressure gain for the fluid to be heated.

In my previous patent application "Heat Exchanger", I disclosed a device which was provided with a means for alternately compressing and expanding a fluid to be heated within a bellows type heat exchange member, and an attached shell containing the fluid releasing heat, with the entire apparatus rotating.

SUMMARY OF THE INVENTION

It is the object of this invention to provide a rotary heat exchanger where a the fluid to be heated is within the heat exchanger and rotates with it, and where the fluid releasing heat is within a stationary housing, or alternately no housing is provided for the fluid releasing heat.

BRIEF DESCRIPTION OF THE DRAWINGS

FIG. 1 is an axial cross section of the heat exchanger, and FIG. 2 is an end view of the same unit.

FIG. 3 is a schematic illustration of one application for the device of this invention, relating to a gas turbine.

DESCRIPTION OF PREFERRED EMBODIMENTS

Referring to FIG. 1, therein is shown an axial cross section of the heat exchanger. 10 is base, 11 is rotating heat exchange member supported by shaft 18 and bearings 17 and 21. Fluid to be heated enters via entry 20, passes outwardly to periphery via passage defined by vanes 12, returns back to center via passages defined by vanes 13, passes out again via passages 15 and inwardly via passages to exit 19. 16 is divider wall, 26 indicates optional thermal insulation layer, and 14 is space for the fluid releasing heat which is outside of the rotating member.

In FIG. 2, an end view is shown. 10 is base, 15 is a vane, 16 is dividing wall, 20 is fluid entry, and 13 is a vane.

In FIG. 3, an application of the heat exchanger is shown, adapted for use as a regenerator in a gas turbine. 30 is shaft, 31 is compressor, 36 is turbine, 35 is burner. Air enters via 38, passes after compression via 32 to center of regenerative heat exchanger 33, and thence to burner 35 and after heating to turbine 36, and from there the exhaust gases pass to regenerator housing 34, and after heat removal, are exhausted, via 37.

In operation, the rotor is caused to rotate, and the gas to be heated enters via entry 20, is alternately compressed and expanded with heat addition from the fluid outside the rotor, and after heating and a gain in pressure, the gas leaves via exit 19. alternately, the passages such as 13 may be made slightly longer than passages such as 12, and the heat exchanger will generate some power; in such case, the pressure gain will be less. Additionally, various other methods may be used to extract work, rather than to have pressure gain, within the heat exchanger for the gas to be heated.

It should be noted that in usual practice, the radial length of passages such as 12 and 13, are not great, and thus the pressure gain per each step is also small. By using numerous compression-expansion steps, higher gains in pressure may be obtained, in aggregate.

The main advantage of the use of the stationary housing such as 34 in FIG. 3, is that dirt and soot as may be produced during combustion, will have a lesser tendency to accumulate within the housing 34, which is stationary. In a unit where the housing 34 rotates with the rotor, dirt and ash would be separated and collected within such housing, causing a maintenance problem.

In a gas turbine as shown in FIG. 3, the pressure gain in the heat exchanger 33 may be sufficient for the turbine, thus allowing the elimination of the separate compressor 31. In such applications, the thermal efficiency of the gas turbine is greatly improved.

The heat exchange member is usually made of sheet-metal stampings, with heat exchange directly from one fluid to another through the member walls. Other type of heat exchange may be used such as heat pipes crossing the heat exchange member wall for increased heat exchange area. Fins also may be provided to enhance heat transfer.

Generally, for lower rotor speeds, numerous compression-expansion steps are required, while for high rotor speeds, fewer steps are necessary. Fluid velocity through passages such as 12 extending outwardly, is usually higher than the fluid velocity through passage 13 extending inwardly. Also, number of vanes in passage 12 is usually greater for closer fluid tangential movement control, than in passage 13, where tangential movement may be allowed for the fluid passing through. The difference in the number of vanes is indicated in FIG. 2, for the two passages.

Thermal insulation may be provided in the outwardly extending fluid passages if desired; usually the same effect may be provided by having a higher radial velocity for the fluid in the outwardly extending passages than in other areas of the heat exchanger.

Note that the fluid within this heat exchanger may be either cooled or be heated by the fluid outside, depending of temperatures of the two fluids. Where the fluid within the heat exchanger is cooled, the main heat exchange occurs during compression, that is, during the travel of the fluid outwardly within the heat exchanger member folds, and for heating the main heat exchange occurs during expansion as the fluid travels inwardly within the heat exchanger member folds.

The heat exchange member is usually made in the form of folds similar to bellows, from sheetmetal. The vanes then can be formed to the sheetmetal, and the entire assembly supported by the rotor shaft through baffles, such as 16 in FIG. 1,. Spaces such as 14 are left between the folds to allow for circulation of the fluid outside for heat transfer. The sheetmetal walls of the folds may also be provided with grooves for enhanced heat transfer, in areas where heat transfer is desired.

To provide for starting of fluid flow through the heat exchanger, the entry pressure at opening 20 should be higher than at exit 19. Alternately, the diameter of exit 19 may be made larger than entry 20.

For the several compression-expansion steps, the temperature of the fluid to be heated increases from step-to-step. The fluid to be heated and the fluid outside of the heat exchanger are usually in counterflow as shown in FIG. 3.

I claim:

1. A method of heat exchange and fluid pressurization comprising:
   a. alternately compressing and expanding a compressible fluid in a plurality of compression-expansion steps and simultaneously adding heat into said fluid during the passage of said fluid through the compression-expansion steps;
   b. causing the temperature of said fluid to increase from step-to-step during the passage of the fluid within the plurality of said compression-expansion steps.

2. The method of claim 1 wherein the amount of work added into the fluid and the work extracted from the fluid is approximately the same in a compression-expansion step and wherein there is a pressure gain for said fluid passing through said compression-expansion step due to heat addition.

* * * * *